US012747146B2

(12) United States Patent
Gebhardt et al.

(10) Patent No.: US 12,747,146 B2
(45) Date of Patent: Sep. 29, 2026

(54) TRANSFER UNIT FOR A LOAD CARRIER AND METHODS FOR TRANSFERRING A LOAD CARRIER

(71) Applicant: Gebhardt Fördertechnik GmbH, Sinsheim (DE)

(72) Inventors: Marco Gebhardt, Sinsheim (DE); Fabian Branner, Waibstadt (DE); Günther Napetschnig, Hohenems (AT)

(73) Assignee: Gebhardt Fördertechnik GmbH, Sinsheim (DE)

(*) Notice: Subject to any disclaimer, the term of this patent is extended or adjusted under 35 U.S.C. 154(b) by 317 days.

(21) Appl. No.: 18/237,730

(22) Filed: Aug. 24, 2023

(65) Prior Publication Data

US 2024/0067511 A1 Feb. 29, 2024

(30) Foreign Application Priority Data

Aug. 24, 2022 (DE) ..................... 10 2022 121 352.8

(51) Int. Cl.

*B66F 9/14* (2006.01)
*B65G 65/00* (2006.01)
*B66F 9/19* (2006.01)

(52) U.S. Cl.

CPC .............. *B66F 9/141* (2013.01); *B65G 65/00* (2013.01); *B66F 9/19* (2013.01); *B65G 2811/06* (2013.01)

(58) Field of Classification Search

CPC .................................................. B65G 2811/06
See application file for complete search history.

(56) References Cited

U.S. PATENT DOCUMENTS

| | | | | |
|---|---|---|---|---|
| 3,848,755 | A | 11/1974 | Bussienne | |
| 11,117,760 | B2 * | 9/2021 | Wagner | B65G 1/065 |
| 11,148,890 | B2 | 10/2021 | Wagner | |
| 12,330,883 | B2 * | 6/2025 | Branner | B65G 1/065 |

(Continued)

FOREIGN PATENT DOCUMENTS

| | | | |
|---|---|---|---|
| DE | 3219459 | A1 | 1/1983 |
| DE | 102008022323 | A1 | 11/2009 |
| DE | 102014003053 | A1 | 9/2015 |

OTHER PUBLICATIONS

Machine translation of DE 3219459 from Espacenet, 1983 (Year: 1983).*

(Continued)

*Primary Examiner* — Mark C Hageman
(74) *Attorney, Agent, or Firm* — Reising Ethington P.C.

(57) ABSTRACT

A transfer unit for the transfer of a load carrier from a first vehicle to a second vehicle and vice versa, or from a first vehicle to a conveyor and vice versa, is disclosed. The transfer unit includes a first entrance that allows the entry of a first vehicle, and the transfer unit opposite the first entrance includes either a second entrance, which permits the entry of a second vehicle, or is connected to the conveyor. The transfer unit may include at least one parking and receiving area for the load carrier, on which the first vehicle can park and receive the load carrier. A centering device for centering a load carrier may be arranged in the transfer unit, so that centering takes place when the load carrier is transferred from the second vehicle to the first vehicle or from the conveyor to the first vehicle.

18 Claims, 7 Drawing Sheets

(56) References Cited

U.S. PATENT DOCUMENTS

| | | | | |
|---|---|---|---|---|
| 2021/0403240 | A1 | 12/2021 | Kumar | |
| 2022/0315339 | A1* | 10/2022 | Pescini | B65G 1/1375 |

OTHER PUBLICATIONS

EESR, EP23192838.3, dated Jan. 30, 2024 (w_translation).
Machine English translation DE102008022323A1.
Machine English translation DE102014003053A1.
German Office Action DE102022121352.8, dated May 17, 2023 (w_machine_translation).

* cited by examiner

TRANSFER UNIT FOR A LOAD CARRIER AND METHODS FOR TRANSFERRING A LOAD CARRIER

CROSS-REFERENCE TO RELATED APPLICATIONS

This application claims priority to German Patent Application No. DE 10 2022 121 352.8, filed Aug. 24, 2022, the contents of which is hereby incorporated by reference in its entirety.

TECHNICAL FIELD

The invention relates to a transfer unit for a load carrier and to a method for transferring a load carrier.

BACKGROUND

Transfer units for the transfer of load carriers are generally known.

SUMMARY

An objective of the present invention is to address or overcome drawbacks associated with earlier technology.

The subject-matter of the disclosure provides various solutions with respect to such issues. Beneficial configurations are disclosed herein.

A transfer unit for the handover of a load carrier from a first vehicle to a second vehicle and vice versa, or from a first vehicle to a conveyor and vice versa, includes a first entrance, which allows the entry of the first vehicle. Opposite of the first entrance, the transfer unit features either a second entrance, which allows the second vehicle to enter, or the transfer unit connects there to the conveyor. The transfer unit features at least one parking and receiving area for the load carrier, at which the first vehicle can park and pick up the load carrier. The transfer unit features at least one centering system for centering a load carrier, wherein the centering device is arranged in a way that allows centering to take place in the transfer unit when the load carrier is transferred from the second vehicle to the first vehicle or from the conveyor to the first vehicle.

Centering devices may, inter alia, increase operational reliability and availability and help avoid errors/malfunctions, such as those discussed in detail below.

For some embodiments, a single centering device may be sufficient. However, often pairs of centering devices may be used. With embodiments centering devices can be arranged symmetrically inside the transfer unit, for example, like the centering rail pairs described in more detail below.

For some embodiments, a preferred approach is to facilitate centering not only during the transfer of the load carrier from the second vehicle to the first vehicle or from the conveyor to the first vehicle, but also vice versa. In both cases, the first vehicle may preferably comprise a shuttle.

For some embodiments, the best areas for parking and receiving may be sections where a vehicle has completely entered the transfer unit and is placing the load carrier.

The transfer of a load carrier from the first vehicle to the second vehicle "and vice versa" and from the first vehicle to the conveyor "and vice versa" may ideally mean that a transfer can take place either from the first vehicle to the second or from the second vehicle to the first, i.e., both transfer directions are possible.

Numerous variants of the transfer unit are conceivable, which differ both in terms of structure and in terms of equipment, i.e., transport equipment, conveyors, etc., between which the load carrier is exchanged. Although numerous variations and modifications are conceivable, at least three basic variants of the transfer unit may be considered within the scope of the present invention. However, the present invention is not limited to the three variants whose main features are outlined below; moreover, numerous modifications and variations of these three variants are conceivable.

As shown in a first variant, the transfer unit may include movable running rails, such as those explained in more detail later. According to this first variant, the transfer unit preferably also features a passive parking and receiving area, for example in the form of a parking rail. Centering devices may be mounted at or on these parking rails. For example, lateral centering rails may be an option, which run essentially parallel to the parking rails. Alternatively or additionally, centering stops may be used, which are mounted on the parking rails, and who's centering areas run orthogonal to a longitudinal direction of the parking rails. As shown in the first variant, the transfer unit features a single parking and receiving area and an entrance on both sides of the parking and receiving area located opposite of each other. In this scenario, one of the entrances serves as the entry point of the shuttle and the opposite entrance serves as the entry point of the industrial truck. In the first variant, the transfer unit allows the transfer of a load carrier from a shuttle to an industrial truck and vice versa, for example to an AGVS (automated guided vehicle system), as discussed in more detail below. The shuttle and the industrial truck use the same parking and receiving area. Details and variations of the first variant of the transfer unit described above are possible and are explained below.

The transfer unit may be equipped with a drive for moving the movable running rails. This drive can be a motor. An eccentric drive, for example, may be an option, which is connected to the running rails, for instance, via coupling gear.

A second variant of the transfer unit features an active parking and receiving area, which can include, for example, chain conveyors or other suitable conveying equipment, such as a suitable continuous moving conveyor. This is referred to in the present invention as a "transfer conveyor". The transfer unit according to the second variant, as well as the first variant, features a centering device. According to the second variant, the transfer unit allows the load carrier transfer from a vehicle, for example, from a shuttle, to a conveyor, for example, a continuous conveyor (such as a chain conveyor), and vice versa. With embodiments, a preferred layout for the running rails of the second variant is to not be movable, i.e., not foldable or swiveling, but as a fixed arrangement in the transfer unit. The second variant of the transfer unit preferably features a single parking and receiving area, which is operated by the transfer conveyor mentioned above.

According to a third variant of the transfer unit, embodiments feature an active parking and receiving area, which can be designed as a transfer conveyor, such as described above in the second variant. However, it features an entrance arranged opposite each other on both sides of the parking and receiving area. In this scenario, one of the entries serves as the entrance for the shuttle and the opposite entrance serves as the entrance for the industrial truck. The third variant is therefore not followed by a conveyor, such as a continuous conveyor, in particular not by a chain conveyor.

The third variant of the transfer unit thus allows the transfer of a load carrier from a first vehicle to a second vehicle, for example, from a shuttle to an industrial truck and vice versa. Due to the active parking and receiving area, this can have such an expansion in the longitudinal direction, i.e., along a conveying direction of the transfer conveyor, that it actually forms two parking and receiving areas. It is not necessary in this case for the industrial truck and the shuttle to drive exactly to the same parking and receiving area, i.e., to share a single parking and receiving area of the relevant station. Instead, the transfer unit can be comprised of two separate parking and receiving areas. If, for example, the shuttle has placed the load carrier on “its” parking and receiving area, which is, for example, part of a transfer conveyor designed as a chain conveyor, this transfer conveyor can then transport the load carrier to the parking and receiving area of the industrial truck, which is also part of the same transfer conveyor. This way can offer more structural freedom, because the restriction that the shuttle and industrial truck have to drive to the same parking and reception area does not exist, in contrast to the first variant. Regardless of whether the transfer conveyor creates one or two parking and receiving areas according to the third variant, consider that the transfer unit features centering stops, whereby the transfer conveyor moves the load carrier after parking for centering against these centering stops. This can result in effective centering because chain conveyors typically have a strong drive unit. If the transfer conveyor already has separate parking and receiving areas for the shuttle and the industrial truck, it may be preferable to have the running rails of the first variant not movable. The centering stops mentioned above should be mounted preferably near the second entrance. The third variant, as well as the first variants, may include additional centering means, for example, centering rails, in addition to or as an alternative to the centering stops.

Unless otherwise noted, the following provisions apply equally to all three variants described above.

The centering rails can bring about centering when the vehicle lowers the load carrier and their clearance width decreases downwards, i.e., toward the running rail. If this reduction in the clearance width is given, a number of configurations for the centering rails can be considered. Although the centering areas of the centering rails are preferably designed as an inclined plane, their shape does not necessarily have to be a plane.

In addition or alternatively, the centering rails can achieve centering during a movement of the load carrier in the longitudinal direction, i.e., into the transfer unit, if their clearance width decreases along this longitudinal direction. The longitudinal movement described above, during which centering can take place, may be carried out in the following ways: a chain conveyor or similar that is connected to the transfer unit as described in the second variant of the transfer unit, or by the transfer conveyor of the transfer unit, as shown in the second or third variant, or by the industrial truck in accordance with the first or third variant of the transfer unit. The movement of the load carrier in the longitudinal direction can also be done with the shuttle.

Centering rails can also be used, if their clearance width decreases both downwards and lengthwise.

If there are several parking and receiving areas, one option is for the centering rails to enclose both parking and receiving areas on the sides. An alternate option may be to assign centering rails, for example, a pair of centering rails, to each parking and receiving area.

Centering may involve a variety of position corrections. The term “centering” is to be understood in this application to describe both rotation and displacement movements, i.e., translation of the load carrier. Mixed movements, comprised of rotation and translation, are also included in the concept of centering.

The conveyor, which according to the second variant connects to the transfer unit, as well as the conveyor, which forms the transfer conveyor of the second and third variant, is preferably a continuous conveyor. It can be a chain conveyor, belt conveyor, roller race, slat belt conveyor, etc. Conveying equipment made with rope lines and straps are an option. The transfer conveyor according to the second and third variant can in some configurations also consist of a telescopic fork, wherein continuous conveyor equipment such as a chain conveyor or the like are usually preferred.

The preferential configuration is where the second entrance and the conveying equipment are alternated with each other.

The vehicles can be shuttles and industrial trucks. The first vehicle can be a shuttle; the second vehicle can be an industrial truck. For example, the industrial truck can operate in a warehouse pre-storage area. The shuttle can preferably be used in the racks.

The industrial truck can be an automatic industrial truck, for instance an automated transport system. The latter are sometimes abbreviated as AGVS, an automated guided vehicle system, or also referred to as driverless transport vehicles.

The first vehicle can enter the transfer unit through the first entrance, the second vehicle can enter the transfer unit through the second entrance.

Depending on the means of transport between the racks or in the warehouse, or after removal from a storage space, a load carrier that is not correctly positioned on the shuttle or industrial truck can cause the load carrier from this shuttle or industrial truck to be placed in such a way that another pick-up of the load carrier by another material handling equipment, for example a telescopic fork or similar, may fail.

Furthermore, even a slight misplacement of a load carrier on a shuttle can often lead to a malfunction. This can lead to problems either after the shuttle or a responsible external sensor system has detected the mispositioning, or after the shuttle enters the warehouse from the transfer unit and does not reach its destination due to the mispositioning.

In the end, numerous errors are conceivable due to load carriers not positioned correctly on the shuttle or on the industrial truck, which will require an operator intervention and thus decrease efficiency and a decreasing throughput for the warehouse.

In general, load carriers that are not positioned correctly on the shuttle, i.e., not centered, can lead to operating troubles, because they may, for example, collide with or get stuck on the racks while driving and, in the worst case, fall off the shuttle. The same applies to load carriers that are not positioned correctly on the industrial truck, which can get caught up on obstacles in the pre-storage zone, as just one example.

The mispositioning and malfunctions just mentioned can be prevented by the transfer unit as shown in the examples listed in the present invention.

The usual and within the scope of the present invention preferred configuration is one where the shuttle and the industrial truck are equipped with a lifting device, which can vertically lift and lower the load carrier. Centering can be done by lowering the load carrier transported by the shuttle or the industrial truck from a raised position. If the load carrier was not positioned correctly on the shuttle or the industrial truck, or if, for example, the industrial truck didn't enter the transfer unit in the optimal manner due to its often high positioning tolerances, the load carrier slides along the centering device while being lowered by the lifting device and is centered in the process. In addition, or as an alternative, centering can be achieved by the shuttle or the industrial truck driving or pressing the load carrier horizontally against the corresponding centering device.

The transfer unit may be designed as part of a rack, sometimes also referred to as warehouse space. Alternatively, the transfer unit can be positioned in front of a rack.

Pallets may be particularly well suited as load carriers. Alternatively, workpiece carriers, containers, wire mesh boxes, or the like can be used as well.

Shuttles are vehicles that operate at least horizontally and often only horizontally in a racking system called a shuttle system and store and retrieve load carriers there.

The entrance is preferably designated as that part or section of the transfer unit through which the shuttle or the industrial truck enters the transfer unit.

The transfer unit, for example that of the first and third variants, may include a positioning device for the industrial truck. One option may be simple, paired, and essentially parallel positioning aids for the industrial truck, for example in the form of lateral guide rails. The positioning device can allow the industrial truck to be positioned precisely, even though it may have a certain navigation and positioning tolerance. This avoids mispositioning of the load carrier, which can occur despite centering, for example if the industrial truck enters the transfer unit at an angle.

The centering device can essentially run along the direction in which at least one of the vehicles enters or exits the transfer unit, or along which the material handling equipment transports the load carrier into or out of the transfer unit. This is preferably a longitudinal direction. This centering device may be the centering rails described in more detail below. The centering devices do not have to run strictly parallel to the direction mentioned above, but may also be arranged to converge along this direction. Since some shuttles may only transport load carriers such as pallets if they have been correctly positioned on top of the shuttle, converging centering devices are usually arranged so that they converge toward the first entrance where the shuttle enters the transfer unit. The centering rails or the like, as described above, are preferably fixed and not movable relative to the parking and receiving areas or the running rails, as an example. However, it may also be possible that the centering rails are arranged in a converging manner from both sides in the longitudinal direction to the center of the transfer unit.

If, within the scope of the present invention reference is made to a centering device, parking rails, running rails and the like in the singular form, the respective feature is always included in the plural form as well. If, for example, there is mention of a running rail in the singular, then it can always be assumed to also cover running rails arranged in pairs running parallel.

The centering device can also run orthogonal to a direction in which at least one of the vehicles enters or exits the transfer unit, or along which the conveying equipment transports the load carrier into or out of the transfer unit. For example, centering stops can be used. A centering area of the centering device, or the centering stop, can run orthogonal in the manner described above. A preferred understanding of a centering area in the context of this invention is to be a surface on which the load carrier or a portion of the load carrier is able to slide for centering. The centering device orthogonal to the direction of the entry and exit described above is preferably a fixed installation in the first variant of the transfer unit and, for example, not movable relative to the running rails and the parking rails. The same applies to the third variant, because the preferred layout is in both the first and the third variant, that the industrial truck, when entering and exiting, is able to lift the load carrier far enough that it does not get caught on the centering devices described above. The best location for the orthogonal centering devices may involve being mounted near the second entrance, and therefore they only have to be negotiated by the industrial truck when it transports a load carrier into or out of the transfer unit. In the second variant of the transfer unit, the before mentioned orthogonally extending centering device is either not present or at least not fixed, but rather installed so that it can move, because the conveyors, such as a continuous conveying system, which is connected to the transfer unit, usually cannot lift the load carrier. It would be conceivable in the second variant of the transfer unit to arrange the orthogonally extending centering devices, for example, foldable, pivotable, retractable or the like. The transfer conveyor could then drive the load carrier against these orthogonally extending centering devices, which are then folded away, swung away or lowered to allow the further transport of the load carrier to the conveyor connected to the transfer unit, without the load carrier having to be lifted.

The aforementioned centering devices, extending orthogonal to the entrance direction of the shuttle, which could be folding, swiveling or retractable, could also be designed in this way for the first and third variant of the transfer unit.

Another option could be to arrange the orthogonal centering devices not near the second entrance, but near the first entrance for all the variants of the transfer unit. This is possible, but often less favorable, because the shuttle's lifting devices are less suitable for lifting the load carrier so that the pallet is above the orthogonal centering devices and the shuttle can enter the transfer unit through the first entrance.

If orthogonal centering devices are present, the preferred design for all variant examples is to provide exactly two centering stops.

As already mentioned in part, the first and third variant of the transfer units may serve to transfer a load carrier from an industrial truck to a shuttle and vice versa, wherein the first entrance can allow the entry of the shuttle, and where the transfer unit features a second entrance opposite the first entrance, which can allow the entry of the industrial truck. In this case, the shuttle and the industrial truck can park the load carrier on the parking and receiving area and pick it up from there. The at least one centering device can be arranged in the transfer unit in such a way that centering can take place when the load carrier is transferred from the industrial truck to the shuttle. Another option, the preferred one, is that centering can also be carried out when the load carrier is transferred from the shuttle to the industrial truck.

As already mentioned previously, the first variant of the transfer unit may include a running rail for the shuttle, which can be reversed and moved from a first to a second position. In the first position, the running rail can allow the industrial truck to enter the transfer unit and in the second position allow the shuttle to enter the transfer unit.

The reversible movement from the first position to the second position can be a flip, a turn, a swivel, an entering and exiting or the like. The preferred option may be to turn the running rail. The preferred layout for the running rail includes a rotational axis.

In the first position, the folded-up running rail can allow the industrial truck to enter by not preventing its entry through the second area element, which is perceived as an obstacle by at least one suitable sensor of the industrial truck. The industrial truck may also feature several such sensors.

In the second position, the folded down running rail can allow the shuttle to enter, which then enters the transfer unit on the running rail.

As described above, a reverse movable running rail can, for example, in the context of the first transfer unit variant, be advantageous if the shuttle and the industrial truck move into the transfer unit from different height levels and/or if the heights of the shuttle and industrial truck differ.

For example, the level of the rack from which the shuttle passes through the first entrance into the transfer unit may be at a different height, for example, higher, than a pre-storage zone where the industrial truck passes through the second entrance to the transfer unit.

Such different height levels can also be useful if a drive or parts thereof and/or a gear unit or parts thereof are set up in the transfer unit. The above-mentioned drives, gear units or parts thereof may be arranged, for example, below the height level of the running rail, so that the shuttle can negotiate these drives, gear units or parts of them while traveling on the running rail. At the same time, the drives, gear units or parts of them can be arranged in such a way that the industrial truck can enter the transfer unit through the second input. One option is to set up such drives, gear units or parts thereof near the first entrance and as far away as possible from the second entrance.

The transfer unit may include a first area element, mechanically coupled to the running rail, which is set up to be detected as an obstacle in the first position by a shuttle sensor. The shuttle may be equipped with several such sensors. The first area element is used, for example, for a transfer unit of the first variant.

From the point of view of the shuttle, the first area element is therefore a moving obstacle. Regardless of any control device commands, the shuttle's on-board equipment, for example, a collision sensor, may recognize the first area element as an obstacle. If the transfer unit is in the first position, the shuttle does not enter the transfer unit, even if it receives such an erroneous command from a control device. Therefore, the first area element will prevent the shuttle from entering the transfer unit when the running rails are folded up, which would result in damage to the shuttle and the transfer unit.

The area elements thus better ensure that no damages occur in the event of an error.

Coupling between the first area element and the running rail can be achieved via a set of gears, for example via a coupling gear unit or the like. In the context of the present invention, however, it may also be an option to connect the first area element directly to the running rail, rigidly or movable, which is intended to be covered by the term 'coupling' as well. Any configuration which causes the first area element to also move in response to a movement of the running rail can be understood as 'coupling' within the scope of the present invention.

For example, a rigid connection between the area element and the running rail can be present, if the area element is designed as a flag that is connected to the running rail in such a way that it can neither perform a rotation nor a translation relative to the running rail. Such a flag closely follows every movement of the running rail.

For example, a mobile connection between the area element and the running rail can be present, if the area element is designed as a flag that is connected to the running rail via a screw, a bolt or the like in such a way that it can perform a rotation but not a translation relative to the running rail.

It may be designed to be a direct or indirect coupling between the running rail and the first area element. In case of an indirect coupling, for example, it may be possible that a movable gear unit that is coupled with the running rail is also coupled with the first area element, and a movement of this gear unit will always move both the running rail and the first area element.

The transfer unit may include a second area element, mechanically coupled to the running rail, which is set up to be detected as an obstacle in the second position by a sensor of the industrial trucks. The statements made above for the first area element with regard to coupling also apply to the second area element. The second area element is used, for example, for a transfer unit as designed for the first variant.

The movement of both area elements is mechanically coupled with the movement of the running rail. The area elements acting as moving obstacles and thus ultimately as a trigger for a stop signal on the shuttle and the industrial truck thereby carry out their function completely independently of any commands by the control device. Errors in the control device will therefore not have any effect on the functionality of the area elements.

The transfer unit can consist of only the first coupled area element, only the second coupled area element, or both coupled area elements.

If the transfer unit features the first and the second coupled surface element, these can be separate components. However, it can also be possible that the two area elements are sections of the same component.

For instance, the sensors of the shuttle and/or the industrial truck that recognize the area elements can be one or more collision sensors, which are often used as on-board equipment in shuttles and industrial trucks.

The coupled area elements make it possible in a simple and robust way, for example, to prevent the industrial truck from entering the second position and to not let the shuttle enter the first position.

The transfer unit may include a sensor which is configured to detect the presence of the shuttle and/or the industrial truck in the transfer unit. For this purpose, the transfer unit may be equipped with one or more suitable sensors.

Another option is that the transfer unit features a single sensor, which is set up to detect both the presence of the shuttle and the presence of the industrial truck in the transfer unit. Additional sensors, which serve other purposes, may also be present.

The present invention further features a rack which is equipped with a transfer unit as described above, wherein the transfer unit is designed as a point of intersection between the rack and an area upstream of the rack, for example, a pre-storage zone.

The present invention further includes a shuttle system featuring a rack as described above and at least one vehicle, for example, a shuttle, and optionally an industrial truck.

The shuttle system may be designed as a level-bound system and may service one or preferably several levels. There may be optional aisles. Preferably, at least two shuttles per level should be available. These shuttles do have the capability of moving along the main travel routes and transversely to these main travel routes, i.e., as desired within the levels. Such a system may include lifts for the material being transported, especially if there are several levels.

The shuttle system may be designed as an aisle-bound system and may service one or preferably several levels as well as one or preferably several aisles. In such a system, the shuttles can move horizontally and vertically within the aisles, but they cannot change aisles. Horizontal movement of the shuttles is therefore limited to the corresponding aisle. Such a system may include lifts for the shuttles to allow the shuttles to change levels.

In the level-bound system and in the aisle-bound system, the shuttles preferably have two degrees of freedom of movement. The shuttle system can also be designed as an aisle-bound and level-bound shuttle system.

Furthermore, the shuttle system may be designed as an unrestricted system and may service one or preferably several levels. There may be optional aisles. In such a system, lifts can be installed for the shuttles, which enable them to move in the vertical direction. The shuttles have three degrees of freedom of movement in an unbound system through routes crossing the main travel routes or aisles. Unbound systems facilitate high flexibility. The performance of unbound shuttle systems can be increased by introducing additional shuttles.

The shuttle system may include a light barrier which is set up to detect an industrial truck approaching the transfer unit and a person approaching the transfer unit and to be able to distinguish between the two. Preferably, several such light barriers are present, which secure all transfer units. These can be retro-reflective photoelectric sensors, light barriers or through-beam photoelectric sensors.

Preferably, the light barrier can not only distinguish between an industrial truck and an approaching person, but also includes a so-called muting function. The process is as follows: The action usually triggered by the interruption of the light beam, a stopping or decommissioning of a specific device or a specific area for instance, is not carried out when at least one additional muting light barrier detects that the object causing the interruption is not a person, but rather the presence of an industrial truck. Such muting is therefore a temporary and automatic muting of the associated light barrier.

A light barrier with muting function can be very advantageous in the context of the present invention, because although industrial trucks, such as AGVS, are usually equipped with collision sensors and can efficiently prevent personal injury; shuttles often work in an area not accessible to passenger traffic, and often do not have such sensors or at least are not equipped with such sensors to rule out personal injury with sufficient reliability. Since the transfer unit, according to the invention, can grant access of persons at the transfer unit who must be protected against injuries caused by the shuttle, the previously mentioned light barrier increases their safety.

As already mentioned above in parts, the transfer unit, for example, the third variant, may include a first parking and receiving area for the load carrier, where the shuttle can park and pick up the load carrier. Additionally, the transfer unit may feature a second parking and receiving area for the load carrier, where the industrial truck can park and pick up the load carrier. The transfer unit may also include a conveyor, referred to here as a transfer conveyor, which is set up to move the load carrier between the first parking and receiving area and the second parking and receiving area.

The expansion and the angle to the horizontal of the centering device, with regard to an angle between the centering area and the horizontal, may be dependent on a lift height, for example, on a maximum lift height of one or both vehicles.

The centering devices of all variants are preferred to be passive centering devices in the sense that the centering is carried out by the load carrier to be centered as it slides along a surface of the centering device or nudges it, whereby it is centered. For example, the load carrier is lowered by a lifting device of a vehicle or pushed horizontally against the centering device by a chain conveyor. Foldable, swiveling or retractable centering devices are in the sense described above considered passive, because they do not move during the centering process. However, using active centering devices is also a possibility for all variants. For example, rams or the like, which can be moved orthogonally to the longitudinal direction, can be placed laterally next to the storage and transfer units to center the load carrier. This active centering can be carried out both while the load carrier is on a vehicle or conveyor located in the transfer unit and when it has been parked in the parking and transfer unit. Another option for active centering devices may be to lift the load carrier for centering purposes. Numerous variations of active centering devices are conceivable. However, the use of passive centering devices is preferred.

The transfer unit may include a light barrier, preferably exactly one. The light beam of this light barrier can be installed diagonally within the transfer unit in a way so that the light barrier can detect both the presence of a shuttle and an industrial truck in the transfer unit. This light barrier may be used in the first variant of the transfer unit, for example. This light barrier is preferably set up in such a way that it can detect the presence of both a shuttle and an industrial truck, but not the presence of a pallet. This is how the light barrier only detects when the transfer unit is occupied by a vehicle. This light barrier is not the optional light barrier of the shuttle system described above, which is set up to detect an industrial truck approaching the transfer unit, but a light barrier which only detects vehicles within the transfer unit.

The present invention also includes a method for transferring a load carrier in a transfer unit as described below. Process steps, which are described above with respect to the transfer unit and the shuttle system, can also be used in the context of the methods described below and vice versa.

The process includes the following steps:

A conveyor or vehicle places a load carrier on a parking and receiving area of the transfer unit, The load carrier is centered, The conveyor or vehicle picks up the load carrier from the parking and receiving area of the transfer unit.

According to the above process, another option may be to perform the following process steps. The following are the preferred process steps when using a transfer unit according to the first and possibly the third variant.

A shuttle or industrial truck loaded with a load carrier enters the transfer unit through the first or second entrance The shuttle or industrial truck lowers the load carrier, which, if necessary, is centered by sliding along centering devices The shuttle or industrial truck leaves the transfer unit through the first or second entrance The industrial truck or shuttle enters the transfer unit through the opposing second or first entrance and picks up the load carrier previously parked there.

The gliding along the centering devices usually occurs when the load carrier has been placed not centered on the shuttle or industrial truck.

Both the shuttle and the industrial truck should preferably include a lifting device, which can lift and lower the loaded load carrier. The next preferred practice, before entering the transfer unit, is to lift the load carrier to a height that a collision or contact with the centering devices or other components of the transfer unit can be ruled out. Centering then takes place when lowering within the station. The vehicle entering the transfer unit after parking the load carrier, i.e., the industrial truck or the shuttle, preferably enters the transfer unit with the lifting device lowered and picks up the load carrier by raising the lifting device as soon as it is in a predetermined position below the load carrier.

The present invention further includes a method for transferring a load carrier in a transfer unit with a transfer conveyor by following the process steps below:

A load carrier is placed on the transfer conveyor of the transfer unit by a shuttle or a conveyor, The load carrier is centered, The conveyor or shuttle picks up the load carrier from the transfer conveyor of the transfer unit.

The present invention further includes a method for operating a shuttle system, where the shuttle and the industrial truck communicate directly or indirectly via a control system with the transfer unit to move the running rail from the first to the second or from the second to the first position. This method for operating a shuttle system is preferred in the context of the transfer method for a load carrier, where a transfer unit according to the first variant was chosen.

Within the framework of the before-mentioned method for operating a shuttle system, it is possible that the vehicles, i.e., a shuttle and industrial truck, communicate wirelessly with the transfer unit, for example, to command or make a request for moving the running rail or to require such a movement.

Communication can be centralized or decentralized. For example, each transfer unit may have a control device or several units share such a control system, which is also integrated in the communication.

Another option is to allow communication to take place via a wired system, or via light barriers or the like.

In the event of direct communication between the shuttle and the industrial truck with the transfer unit, for example, a shuttle approaching the transfer unit shortly before arrival can cause the transfer unit to move to the first position in order to allow the shuttle to enter, as long as there is currently no industrial truck in the transfer unit. This can be determined using the light barrier. Direct communication takes place without the involvement of the control unit.

With indirect communication, the shuttle approaching the transfer unit can communicate with the control device to cause the shuttle's transition to the first position.

BRIEF DESCRIPTION OF THE DRAWINGS

Additional benefits, features and details of the invention are shown in the following descriptions of preferred features as well as in the drawings, which show.

For the sake of clarity, not all features in all figures have reference numbers.

DETAILED DESCRIPTION

Figure 6:
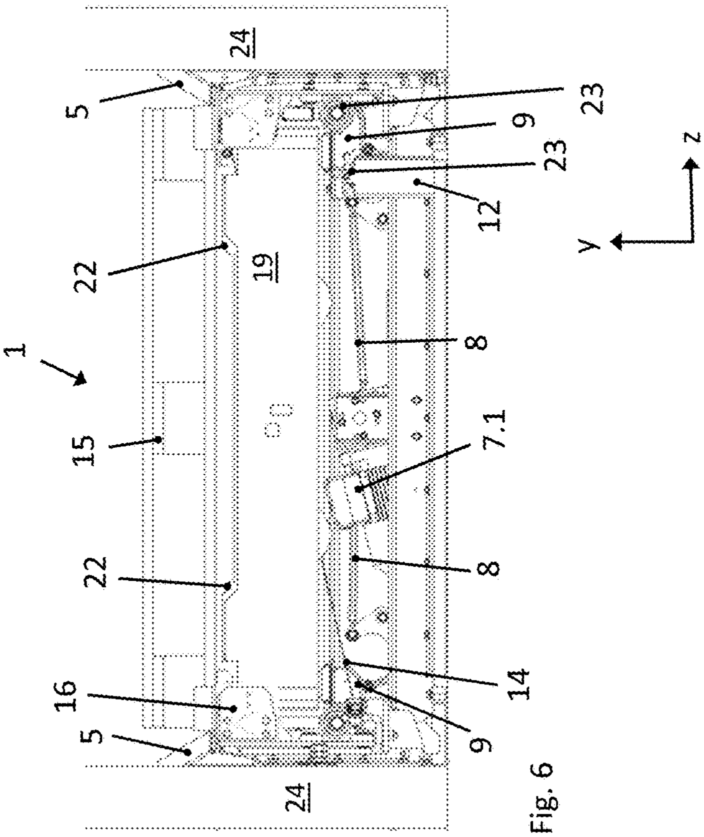
FIG. 6 generally illustrates the view of FIG. 5, but with a shuttle in the transfer unit.
Figure 7:
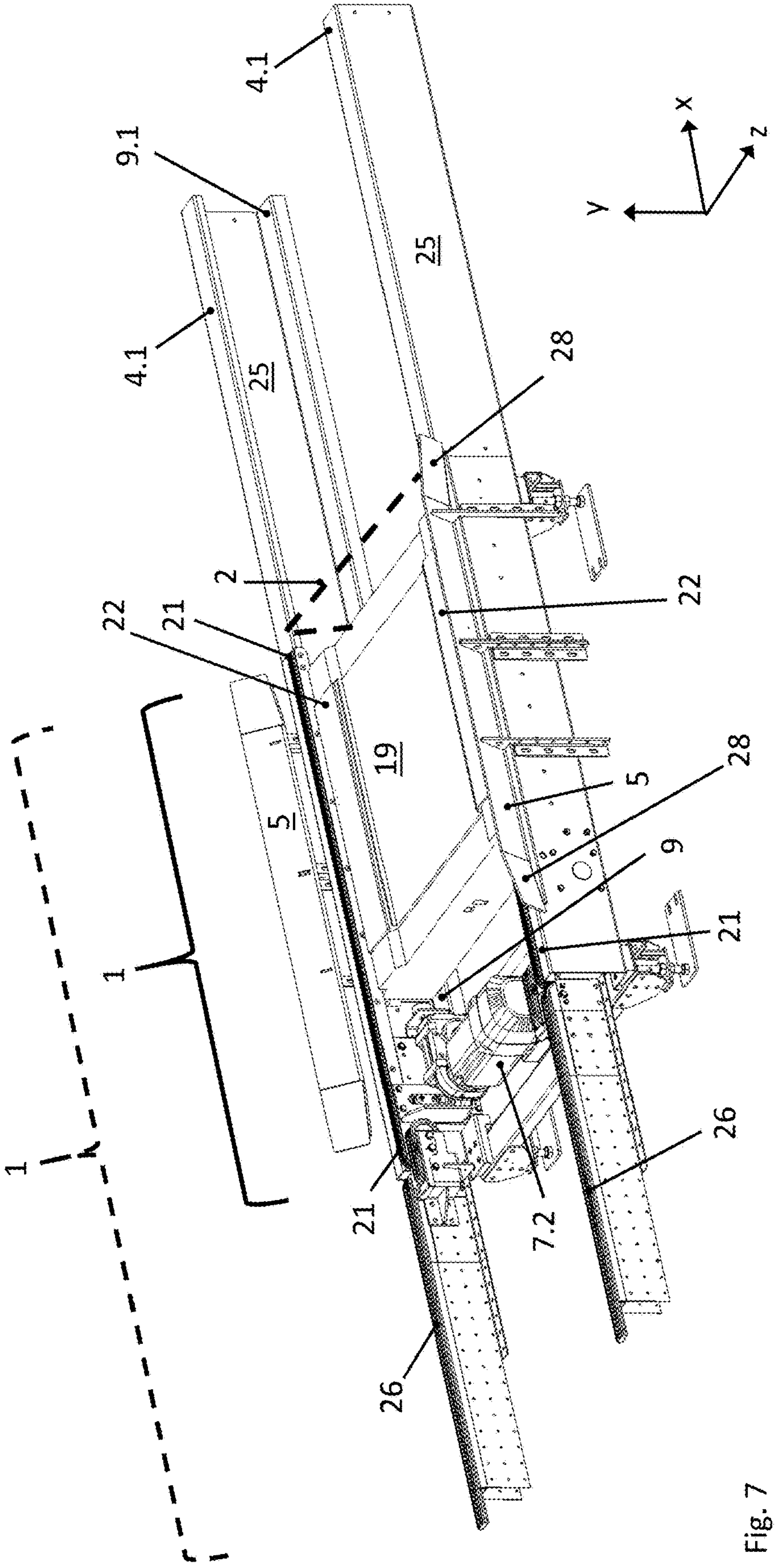
FIG. 7 generally illustrates a variant of a transfer unit 1 with a transfer conveyor.

FIGS. 1 to 6 show a first variant of a transfer unit 1, and FIG. 7 shows a second variant of a transfer unit 1.

Figure 2:
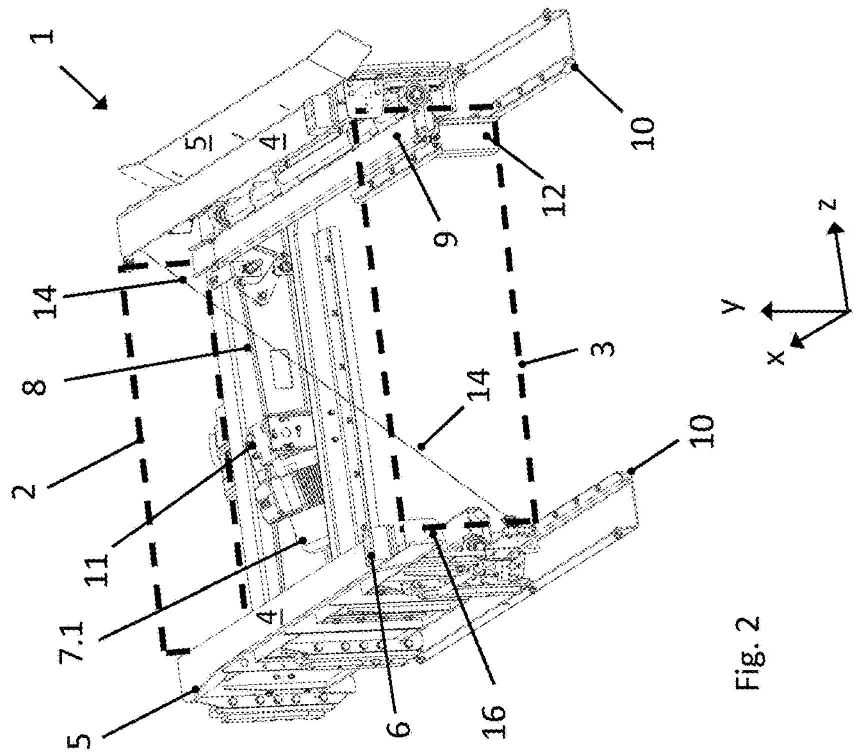
FIG. 2, generally illustrates a transfer unit according to FIG. 1 in a second position.
Figure 1:
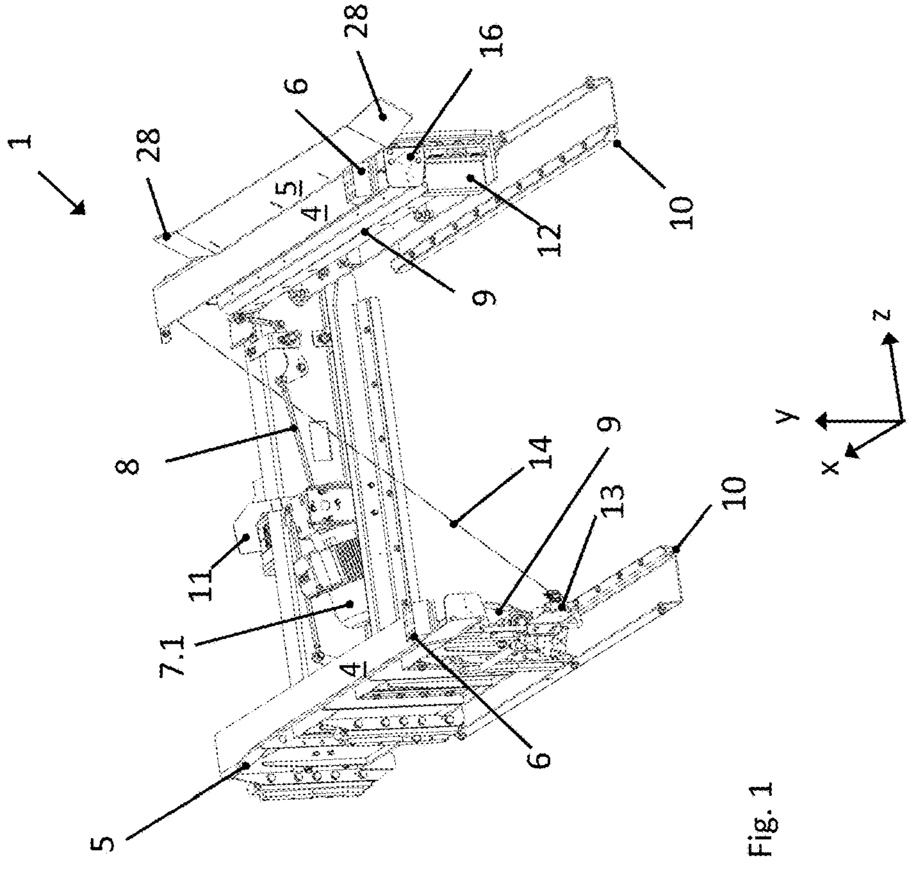
FIG. 1 generally illustrates a first variant example of a transfer unit 1 in first position.

The transfer unit 1 shown in FIGS. 1 and 2 feature a pair of parking rails 4 for receiving a pallet 15, a pair of centering rails 5, a pair of centering stops 6 on the parking rails 4, a pair of centering aids 10, a motor 7.1, and coupling gear 8, plus a pair of running rails 9.

Furthermore, a first area element 11 and a second area element 12 are shown. FIG. 2 shows areas of the transfer unit 1, also marked, which act as the first entrance 2 or second entrance 3. A light barrier 13 and an associated light beam 14 are also shown. The light beam 14 runs diagonally and thus allows both a shuttle 19 and an industrial truck 20 to be detected in transfer unit 1. However, the presence of a pallet 15 is not detected. Furthermore, FIG. 1 depicts angled sections 28 of the centering rails 5 and a rotation axis 29 of the running rail 9 is also shown.

Figure 3:
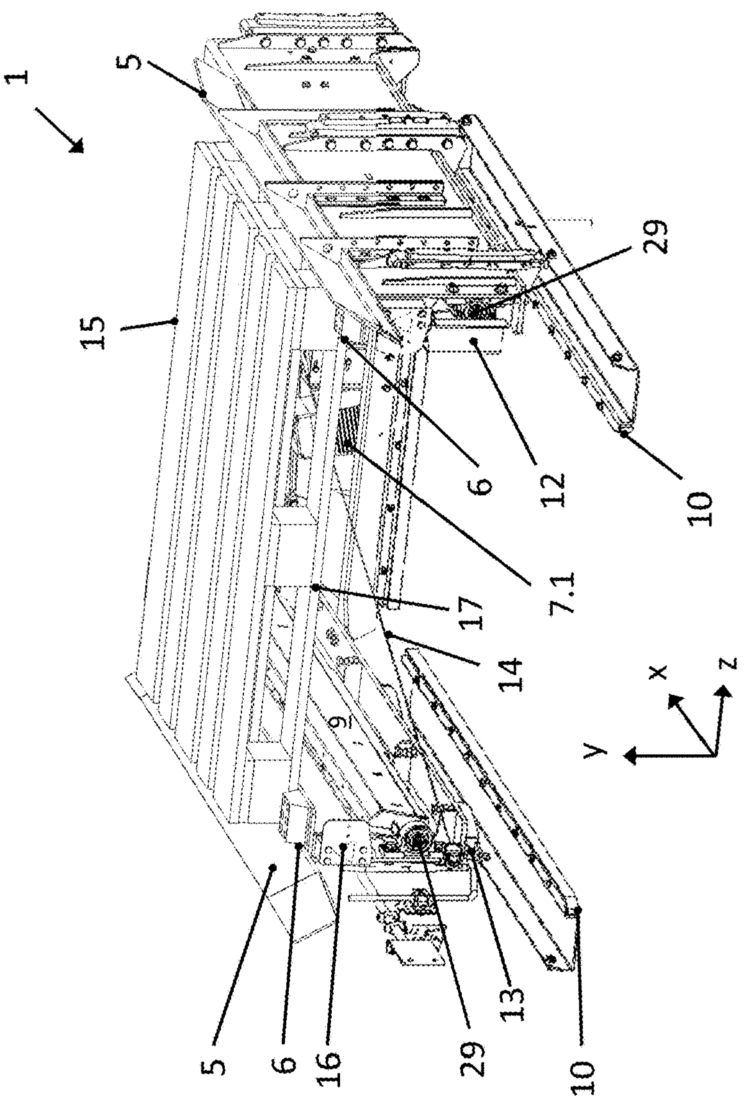
FIG. 3 generally illustrates another view of transfer unit 1 according to FIG. 1 with pallet.

In FIG. 3, a bottom edge 17 of the pallet 15 is also visible.

Figure 4:
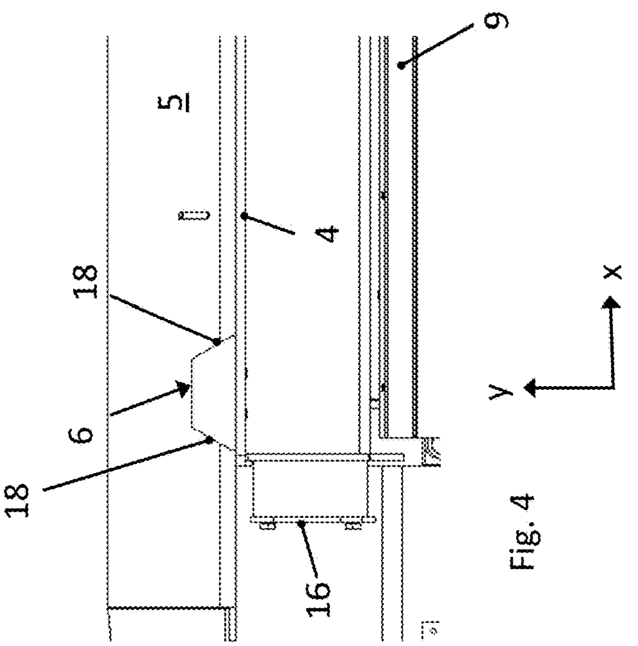
FIG. 4 generally illustrates a cut-away section through a parking rail according to FIG. 2 parallel to the x-y plane.

In FIG. 4, the folded down running rail 9 and a centering area 18 of the centering stop 6 are shown.

Figure 5:
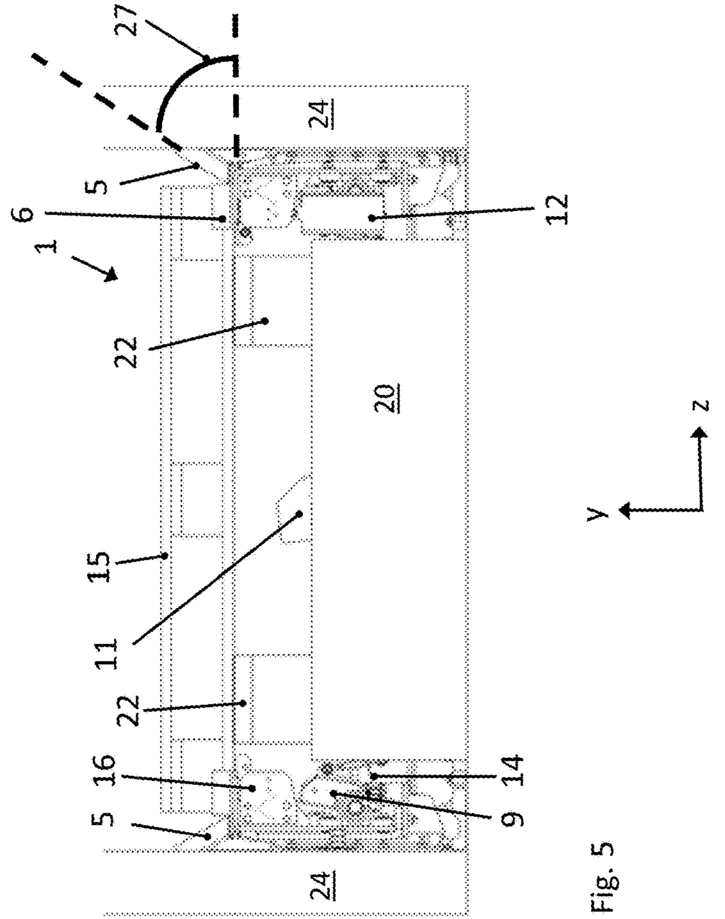
FIG. 5 generally illustrates a front view of transfer unit with an industrial truck located inside and a pallet in a racking system.

In FIG. 5, the transfer unit 1 is in the first position, the running rails 9 are folded up. The industrial truck 20 is located in transfer unit 1. Two extended lifting devices 22 of the industrial truck 20 can be identified. Plus, in FIG. 5, an angle 27 is visible between the centering rail 5 and the z-axis or the horizontal, emphasized or extended respectively by dashed lines.

In FIG. 6, transfer unit 1 is in the second position, the running rails 9 are folded up. The shuttle 19 is located in transfer unit 1. A mounting element 23 is also recognizable, with which the second area element 12 is attached to the running rail 9.

In FIGS. 5 and 6, a guard rail 16 can be seen on both sides.

FIGS. 5 and 6 show that a clearance width measured in the z-direction between the centering rails 5 decreases downwards, i.e., in the negative y-direction. In FIG. 1, as well as in FIG. 7 which will be discussed in more detail below, it is shown that the clearance width measured in the z-direction between the centering rails through the angled sections 28 also decreases in a positive and negative direction when the pallet 15 is retracted from both sides of the transfer unit 1.

The centering stops 6 with the centering areas 18 extending orthogonal in the longitudinal direction of the centering rails 5 are mounted near the second entrance 3.

In FIG. 7, adjacent chain conveyors 26 and channel rails 25 are recognizable in addition to the transfer unit 1, whereby only a small section of the chain conveyors 26 and channel rails 25 is shown in each case. The channel rails 25 consist of running rails 9.1 and parking rails 4.1, which connect in alignment with the running rails 9 and the transfer conveyors 21 of the transfer unit 1. The chain conveyors 26 are also aligned with the transfer conveyors 21 of the transfer unit 1. Furthermore, a motor 7.2 is shown, which drives the transfer conveyor 21. In FIG. 1, other angled sections 28 of the centering rails 5 are visible.

FIGS. 8 to 11 are schematics of some possible incorrect positions of the pallet 15 in comparison to the desired position 32. The "desired position 32" here is an example to describe a desired position on the industrial truck 20 or the chain conveyor 26. FIGS. 8 to 11 are only schematics to illustrate how a shift and/or rotation of the pallet 15 can be corrected compared to its desired position 32.

Figure 8:
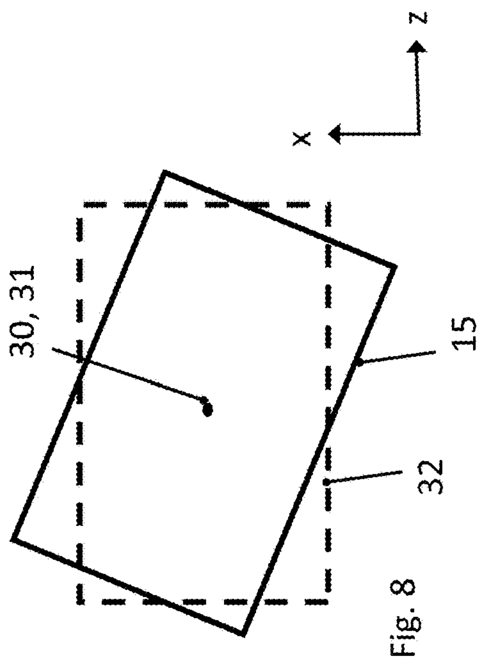
FIGS. 8 to 20 generally illustrate greatly simplified schematic views, which show individual aspects of variants of the present invention.

In FIG. 8, a center point 30 of the pallet 15 and a center point 31 of the desired position 32 coincide. The mispositioning of the pallet 15 in FIG. 8 therefore consists only in a rotation (here clockwise) in comparison to the desired position 32.

Figure 9:
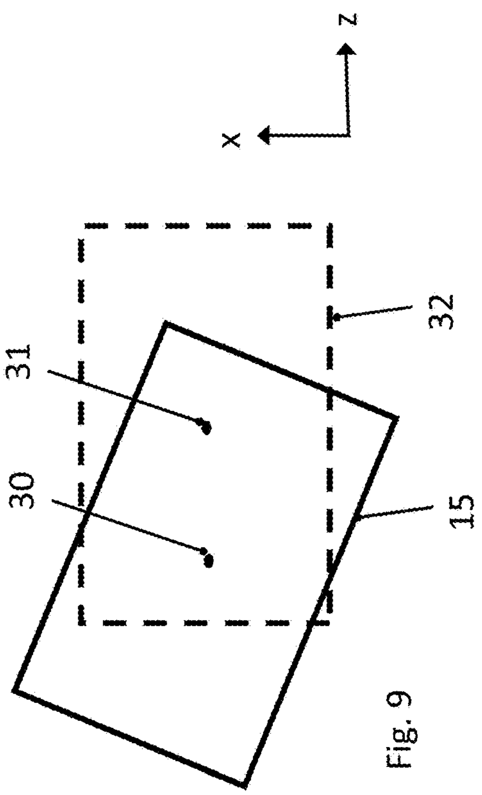

In FIG. 9, the mispositioning of the pallet 15 is in the rotation already shown in FIG. 8 and an additional shift in the negative z-direction (transverse direction), i.e., to the left in FIG. 9.

Figure 10:
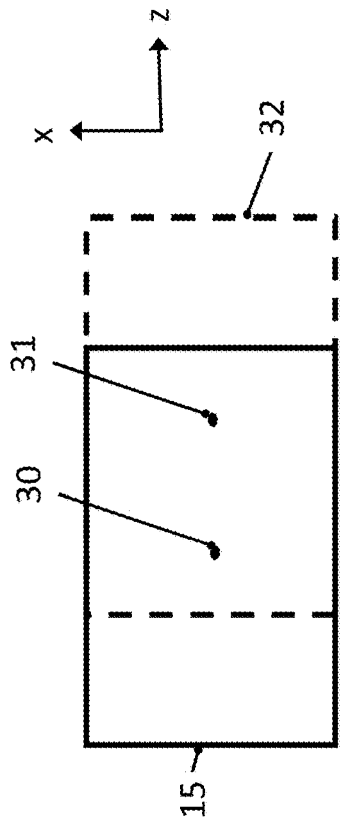

In FIG. 10, the mispositioning of the pallet 15 is exclusively a shift in the negative z-direction, i.e., to the left in FIG. 10.

Figure 11:
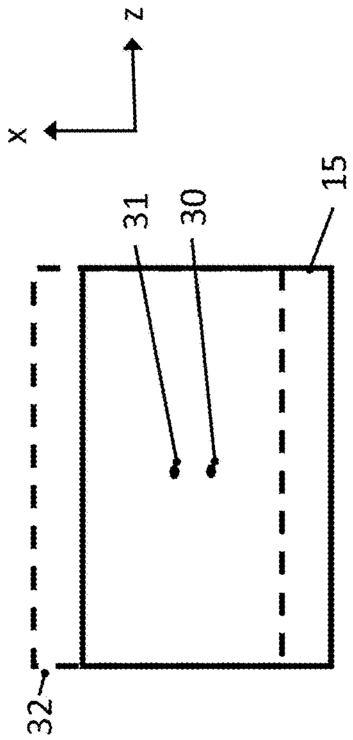

In FIG. 11, the mispositioning of the pallet 15 is only a shift in the longitudinal direction x, i.e., in FIG. 11 upwards.

Usually, an effective direction of gravity is in the negative vertical direction y, a horizontal plane is preferably the x-z plane.

Surfaces of running rails 9, parking rails 4, and transfer conveyors 21 preferably run parallel to the horizontal plane.

Figure 12:
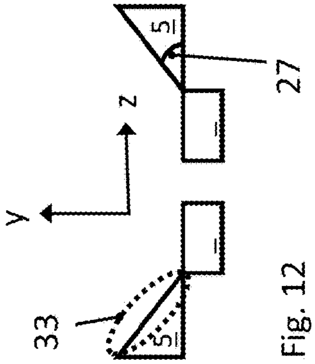

FIG. 12 shows simple schematic views similar to those of FIGS. 5 and 6, the parking rails 4, and the centering rails 5. FIGS. 13 to 20 show other conceivable variants.

In the variant according to FIG. 12, the sections 13 of the centering rails 5 as cross-section, i.e., in the y-z plane, are shown as lines.

As indicated in FIG. 12 on the right side, the section 33 shown in the cross-section as a line in relation to the transverse direction z, i.e., to a horizontal, is inclined at an angle 27.

Figure 14:
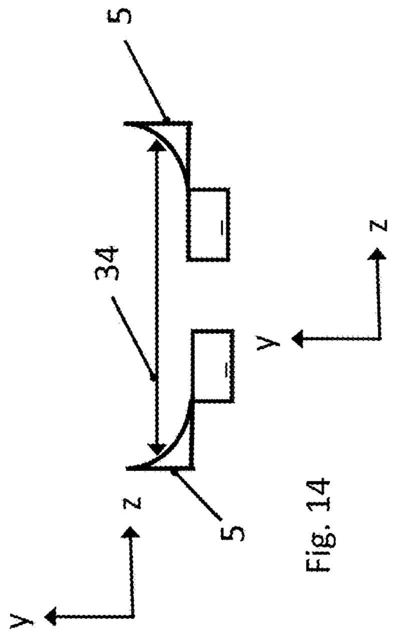
Figure 13:
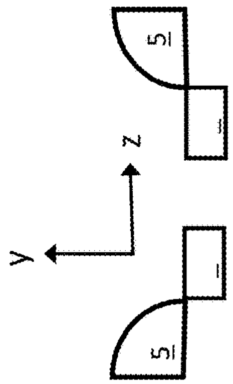

The sections of the centering rails 5 corresponding to sections 33 in FIG. 12 in FIGS. 13 and 14 are depicted as circular arcs. For a better overview, these circular sections are not marked with the reference number 33.

Figure 15:
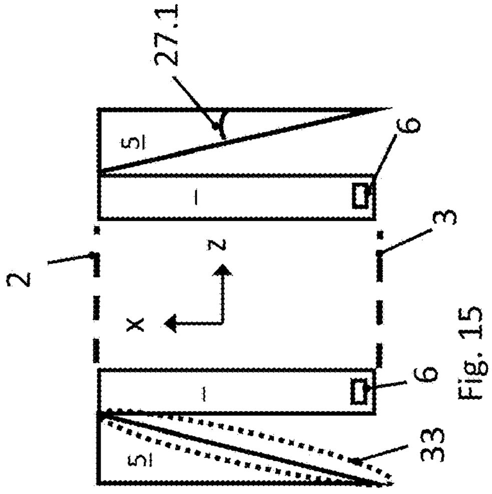

In FIG. 15 the sections 33 of the centering rails 5 are shown as lines also in the longitudinal section view, i.e., in the x-z plane. The centering rails 5 thus converge in the x-direction to the first entrance 2. If speaking of a longitudinal direction of the transfer unit 1, the preferred direction is the one parallel to the x-axis. If a direction extending orthogonal to the longitudinal direction is mentioned, sometimes also briefly referred to as an orthogonal direction, this is preferably the direction parallel to the z-axis.

Figure 17:
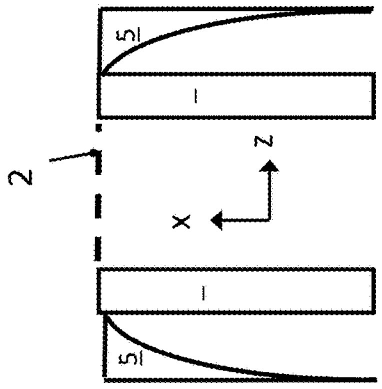
Figure 16:
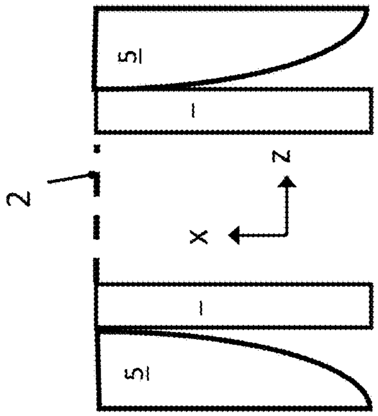

Sections of the centering rails 5 in FIGS. 16 and 17 corresponding to sections 33 in FIG. 15 (not provided with reference numbers there) are formed as branches of a parabola.

The sections of the centering rails 5 (not provided with reference numbers there), which can come into contact with the pallet 15, are convex in FIGS. 13 and 16, concave in FIGS. 14 and 17.

FIGS. 5 and 6 show that a clearance width 34 measured in a transverse direction, i.e., along the z-axis, between the centering rails 5 can decrease both in the longitudinal direction x and in the negative vertical direction y. A noticeable decrease in the clearance width 34 in the negative y-direction come into play in FIG. 12, preferably in transfer units 1 according to the present invention. The variants according to FIG. 13 et seq. are optional.

Figure 18:
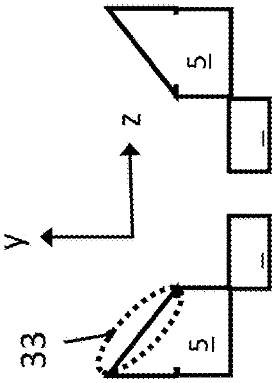

FIG. 18 shows by example that in the negative vertical direction y (i.e., downwards) converging sections 33, which are used for position correction, do not have to extend over the entire vertical direction y in the cross-section. The centering rails 5 may also include sections that are parallel to the vertical direction y. In these sections, running parallel to the vertical direction y, the clearance width 34 remains constant.

Figure 19:
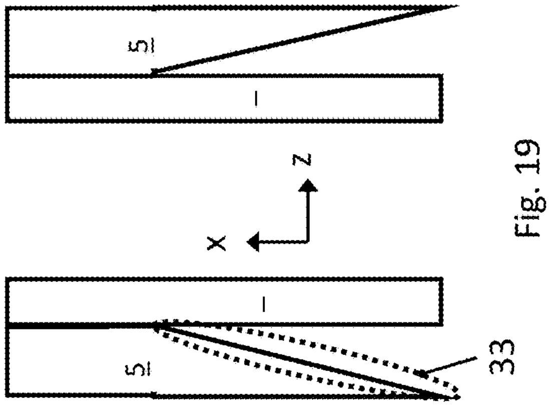

FIG. 19 shows by example that in longitudinal direction x converging sections 33, which are used for position correction, in the longitudinal view do not need to extend over the entire longitudinal direction x. The centering rails 5 may also include sections which run parallel to the longitudinal direction x, and in which the clearance width 34 remains constant. The section 33 in FIG. 19 runs like the angled section 28 of the centering rail 5, for example, as shown in FIG. 1.

Figure 20:
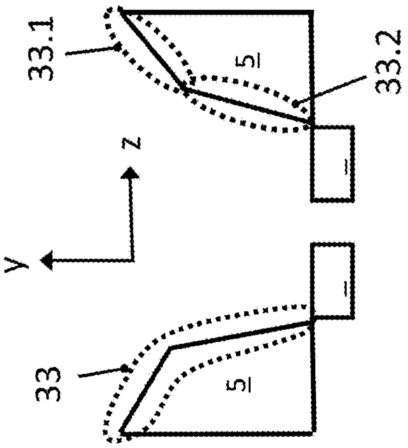

FIG. 20 shows, by way of example, that sections 3, which serve to correct the position, can also be represented in the cross-section as a series of several shapes, in this case specifically as two lines. Whereas the clearance width 34 between the centering rails 5 decreases in the negative y-direction continuously. Since a first partial section 33.1 has a smaller angle of inclination to the transverse direction z (i.e., to the horizontal) than a 10 second partial section 33.2, the degree of this decrease in the clearance width in the region of the first partial section 33.1 is stronger than in the region of the second partial section 33.2.

The angle 27 shown in FIG. 12 can be between 45° and 85°. It can depend on a maximum stroke of the lifting devices 22.

The angle 27.1 shown in FIG. 15 can be between 0.1° and 10°.

The function of the device in this invention is explained as follows with reference to FIGS. 1 to 20:

Transfer unit 1 is designed as a point of intersection between a racking system 24 and a (not shown) pre-storage zone. The racking system 24 can be seen in FIGS. 5 and 6. In addition, channel rails 25 are part of the racking system 24. To take a pallet out of the rack storage, a shuttle 19 traveling there can load this pallet 15 and transport it to the transfer unit 1. For this purpose, the shuttle 19 travels, with suitable wheels or the like, on the running rails 9.1 of the racking system 24 to the transfer unit 1 and on running rails 9 of transfer unit 1 into the transfer unit.

The actual transfer will be different for the two transfer unit 1 variants displayed. We will go into more detail separately with regard to FIGS. 1 to 6 as well as for FIG. 7.

The transfer is carried out in the following way for the variant of transfer unit 1 shown in FIGS. 1 to 6:

If transfer unit 1 is in the first position according to FIG. 1, the first area element 11 and the running rail 9 are folded up. A shuttle sensor 19 perceives the first area element 11 as an obstacle and thus ensures that the shuttle 19 does not enter the transfer unit 1 as long as it is in the first position according to FIG. 1. This sensor can be a collision sensor for preventing collisions, which can be installed as a standard on-board device of the shuttle 19. After the running rail 9 and the area element 11, driven by the motor 7.1 and the coupling gear 8, have been folded down, the transfer unit 1 is in the second position according to FIG. 2, then a shuttle 19 can enter the transfer unit 1 on running rails 9 via the first entrance in the negative x-direction. Motor 7.1 with the aid of coupling gear 8 enables the movement of the folding rails 9. Shuttle 19 controlled by its sensors or following a command from a control device, can completely enter on running rails 9 into transfer unit 1 after lowering of the running rails 9. Opposite of the first entrance 2, a guard rail 16 is planned on both sides to prevent the shuttle 19 from falling out of the transfer unit 1, should it enter into transfer unit 1 too far because of an error. This can be clearly seen in FIG. 6. As previously shown, for example in FIG. 2, the second area element 12 in this position prevents the industrial truck 20 from entering through the second entrance 3, because a corresponding sensor of the industrial truck 20 perceives the second area element 12 as an obstacle.

After entering the unit, the shuttle 19 lowers the pallet 15 with the help of its lifting devices 22 in order to place them on the parking rails 4. The parking rails 4 serve as a parking and receiving area for the pallet 15.

If, before lowering, pallet 15 has been placed on the shuttle 19 in such a way that it is shifted in the z-direction or rotated that way, in comparison to the ideal position on the shuttle 19, the pallet 15 will slide during lowering and settling within the transfer unit 1 in the negative y-direction along at least one of the centering rails 5, which causes centering, i.e., a correct alignment along the z-axis, if necessary, even a rotation of the pallet 15.

If, before lowering, pallet 15 was placed on the shuttle 19 in such a way that it is shifted in the x-direction or rotated that way compared to the ideal position on the shuttle 19, the bottom edge 17 of the pallet 15 slides during lowering and placing within the transfer unit 1 in the negative y-direction along at least one of the centering rails of centering area 18 of the centering stops 6, which will achieve centering, i.e., a correct alignment in the x-direction, if necessary even a rotation of the pallet 15.

Both centering options described above can also be carried out simultaneously during lowering on the centering rails 5 and on the centering stops 6 if the pallet 15 has been positioned incorrectly on the shuttle 19.

Lowering, as previously mentioned, is done by the lifting devices 22 of the shuttle 19, which are shown in FIG. 6 in the retracted position. FIG. 6 thus shows the situation immediately after the shuttle 19 has parked pallet 15, but before it has left the transfer unit 1.

After the shuttle 19 has placed the pallet 15 on the parking rails 4, the situation shown in FIG. 6 has been met. Shuttle 19 then leaves the transfer unit 1 through the first entrance 2 in the x-direction. The running rails 9 then fold up. That situation, after the shuttle 19 has left the transfer unit 1, wherein the pallet 15 was placed, is shown in FIG. 3. As can be clearly seen in FIGS. 3 and 1, in contrast to FIG. 2, the second area element 12, which can rotate and is attached via the mounting element 23 on the running rail 9, follows the movement of the running rail 9 when folding up. This means that this second area element 12 no longer prevents the entry of the industrial truck 20. This can be clearly seen in FIG. 5 as well.

The first area element 11 is in the folded-up position according to FIG. 1 after folding up the running rails 9 and prevents, for example, an error-related entry of a shuttle 19 into the transfer unit.

The industrial truck 20 enters the transfer unit 1 after the running rail 9 has been folded up. FIG. 5 depicts the situation after this entry. The industrial truck lifts the pallet 15 with its lifting devices 22, to a height, i.e., moves it upwards in the y-direction, to where the pallet 15 cannot collide with the centering stops 6 when leaving the transfer unit 1, which would cause a shift of the pallet 15 on the industrial truck 20. The industrial truck 20 then leaves the transfer unit 1 in the negative x-direction.

Transferring the pallet 15 from the industrial truck 20 to the shuttle 19 takes place in the reverse order:

If the transfer unit 1 is in the position shown in FIG. 1, the first area element 11 prevents the entry of a shuttle 19 and the industrial truck 20 loaded with the pallet 15 can enter the transfer unit 1 through the second entrance 3, because the second area element 12 is not detected as an obstacle by a corresponding collision sensor of the industrial truck. When the industrial truck 20 enters the transfer unit 1, the pallet 15 is raised in the y-direction as described above far enough so that it does not catch on the centering stops 6. Centering is then carried out as described above during the lowering process. The industrial truck 20 then leaves the transfer unit 1. The running rail 9 then is folded down so that the transfer unit 1 is in the second position as shown in FIG. 2. The shuttle 19 can now enter the transfer unit 1 via the first entrance 2 in the opposite, i.e., negative x-direction and take up the already centered or correctly positioned pallet 15, for example, in order to store it in the rack.

The transfer is carried out in the following way for the second variant of transfer unit 1 shown in FIG. 7:

The shuttle 19 enters the transfer unit 1 through the first entrance 2. In the process the shuttle initially moves on the running rails 9.1 in the racking system 24, which are aligned with the running rails 9 of the transfer unit 1. The shuttle completely enters the transfer unit 1 and lowers the pallet 15 with the help of its lifting devices 22, whereby the pallet is placed on the transfer conveyors 21. When the pallet 15 is lowered, it can slide along the centering rails 5 shown in FIG. 7 in a manner similar to the centering described with respect to FIGS. 1 to 6. In the process misplacements can be corrected in the sense of a shift along the z-direction as well as in the sense of a rotation within the x-z plane. If, for example, the pallet 15 is shifted in the z-direction in comparison to the ideal position on the shuttle 19, a position correction is done by sliding along the centering rail 5 when the pallet 15 is lowered, whereby the pallet is shifted in the negative z-direction. The same applies to a misplacement in the sense of a rotation around an axis parallel to the y-axis, which is corrected by a corresponding rotation within the x-z plane. After lowering the pallet 15, the transfer conveyors 21, driven by the motor 7.2, then transport the pallet 15 in the negative x-direction to the chain conveyors 26, only one section of which is shown in FIG. 7.

In the transfer unit 1 according to FIG. 7, a pallet 15 is therefore transferred from a shuttle 19 to a chain conveyor 26 and vice versa.

If a pallet 15 is transported from the chain conveyor 26 in the x-direction to the transfer unit 1 of FIG. 7, the transfer conveyor 21 takes over pallet 15. The pallet 15 can be centered on the centering rails 5. If pallet 15 has been placed on the transfer conveyor 21 in a twisted position compared to an ideal position within the x-z plane, this mispositioning can be corrected easily. This is especially true if the centering rails 5 include angled sections 28.

The following applies to all variants of transfer unit 1 shown: This decreasing clearance width in the positive and negative z-direction toward the center of the transfer unit 1, which is affected by the angled sections 28, centering can also take place if the pallet 15 is not lowered in the negative y-direction. The angled sections 28 thus ensure that centering can be carried out easily as long as the pallet is moved into the transfer unit 1 in the positive or negative x-direction. If you have movement in the positive or negative x-direction, the angled sections 28 in FIGS. 1 and 7 cause a clearance width measured in the z-direction between the centering rails 5 to decrease towards the center of the transfer unit 1.

From the point of view of the shuttle 19, the transfer conveyors 21 serve as a parking and receiving area for pallet 15.

With regard to FIG. 7, it should be noted that for the sake of a better overview, only the shuttle 19, but not the pallet 15 to be transferred, were shown.

The transfer unit 1 shown in FIGS. 1 to 6 features a single light barrier 13 whose light beam 14 is situated diagonally within the transfer unit 1 so that the light barrier 13 can detect the presence of both a shuttle 19 and an industrial truck 20 within the transfer unit 1.

FIGS. 1 to 6 show that the shuttle 19 and the industrial truck 20 enter the transfer unit 1 at different heights. The motor 7.1 and the associated coupling gear 8 are arranged within the transfer unit 1 near the first entrance 2 but below the height level of the running rail 9. This way the industrial truck 20 can enter into the transfer unit 1 in the x-direction through the second entrance 3 up to right before the motor 7.1. The shuttle 19 can enter the transfer unit 1 above the motor 7.1 through the first entrance 2. Therefore, neither the shuttle 19 nor the industrial truck 20 are prevented by the motor 7.1 and/or the coupling gear 8 from entering.

Let's look again at the principle of centering and/or position correction with regard to the schematic FIG. 12 et seq.

In principle, position correction can be carried out by lowering the pallet 15 either in the negative y-direction with the lifting devices 22, or while the industrial truck 20 moves in the x-direction through the second entrance 3 into the transfer unit 1.

If a mispositioning according to FIG. 10 is the case, the pallet 15 can, for example, slide along the section 33 indicated on the left in FIG. 12, whereby it shifts in the z-direction, i.e., to the right in FIG. 12, and then becomes centered. As an alternative, the centering can be carried out by moving the pallet 15 in the x-direction, if, for example, the shuttle 20 or a transfer conveyor 21, which is present instead of the parking rail 4, moves the pallet 15 in a configuration according to FIG. 15 in the x-direction.

The above considerations apply not only to FIGS. 12 and 15, but analog to all FIGS. 12 to 20.

If an incorrect positioning as shown in FIG. 8 or 9 is present, it can be corrected essentially in the same way as explained above for FIG. 10.

If the mispositioning shown in FIG. 11 is present, this can be corrected by contacting the centering stops 6, which, as shown in the schematics in FIG. 12 et seq, are indicated only in FIG. 15, but can be present in all variants. For example, the industrial truck 20 can lift the pallet 15 correspondingly far with the lifting devices 22 for the purpose of entering the pallet 15 suspended high over the centering stops 6 in the x-direction into the transfer unit 1. In this process, the industrial truck 20 is positioned in the x-direction in such a way that the pallet 15 slides along the centering areas 18 of the centering stops 6 (which cannot be seen in FIG. 15) when lowering. Let's assume we have the mispositioning in reverse to FIG. 11, in which the pallet 15 is misplaced too far in the positive x-direction on the industrial truck 20; the truck can stop before the centering stops 6 and lower the pallet 15 right before entering the transfer unit, so that the front edge of the pallet 15, (seen in the x-direction), can slide along the centering stops 6.

Although only a few preferred variants of the invention have been described and illustrated, it is obvious that the skilled expert can add numerous modifications without losing the nature and scope of the invention. The following modifications, for example, may be considered:

The industrial truck can be an AGVS.

The transfer unit 1 may be part of a racking system 24, such as part of a shuttle system, for example, part of a deep lane storage system, especially a pallet deep lane storage system.

Other load carriers can be used instead of the pallet 15, for example workpiece carriers, wire mesh boxes, containers, etc.

If the industrial truck 20 and the shuttle 19 enter the transfer unit 1 on the same level, the running rails 9 are not needed. This consideration applies, for example, to the transfer unit 1 according to FIGS. 1 to 6, but can also apply to the transfer unit according to FIG. 7. In that case, the transfer unit 1 can be very simple; it can essentially consist of the parking and receiving area 4 in the form of the parking rails and at least one centering device, for example, include a centering rail 5 or a centering rail pair 5 and/or a centering stop 6 or a pair of such centering stops 6.

The industrial truck 20 can work in a warehouse pre-storage zone, which then can connect directly to the second entrance 3.

The reversible movement of the running rail 9 from the first position to the second position can be a flip, a turn, a swivel, an entering and exiting or the like. The preferred option may be to turn the running rail 9.

The one required parking and receiving area is preferably designed in the form of a parking rail pair 4. An alternative may be, for example, two roller conveyors, two telescopic forks or two chain conveyors that can form the storage and receiving area or at least a part of this storage and receiving area instead of the two parking rails.

The preferred design for the transfer conveyor 21 is a chain conveyor 26. However, other conveyors may be considered.

The guard rail 16 can be removed by loosening the appropriate screws, quick-release fasteners or similar, to be able to remove the shuttle, which entered through the first entrance 2 into the transfer unit 1, at the second entrance 3, if this should be necessary for maintenance or repair.

Non-contact proximity switches can be used, which are also referred to as initiators, to determine whether the running rails 9 have reached the fully folded or fully unfolded end position.

Based on the design of the transfer unit shown in FIG. 7, it may be possible that the chain conveyors 26 form a second entrance 3, so that an industrial truck 20 can enter between the chain conveyors 26 into the transfer unit 1 and can take over a pallet 15 from the shuttle 19 instead of the chain conveyor 26.

The transfer unit can serve as a point of intersection within the racking system 24 or outside the racking system, for instance, directly in front of the racking system 24, for example in a pre-storage zone.

Although not shown in FIGS. 1 to 6, the running rails 9 of the transfer unit 1 connect with the running rails 9.1 in the racking system 24, which are shown only in FIG. 7.

Plus, in the variant according to FIG. 7, it might be a good idea to use a light barrier 13 to detect the presence of the shuttle 19.

Instead of lowering the pallet 15, centering can also be achieved on the centering devices 5, 6, for example, on the centering stops 6, by one of the vehicles 19, 20 driving the pallet 15 against these centering devices 5, 6. Centering for centering rails 5 is preferably carried out without lowering the pallet 15 with the lifting devices, if the centering rails 5 are arranged converging, i.e., tapered along the x-axis in at least one direction.

For example, in the transfer unit 1 shown in FIGS. 1 to 6, the centering stops may be fixed and permanently mounted on the parking rails 4, and thus not movable in relation to the parking rails.

Although in the FIG. 12 et seq. versions of the first variant of the transfer unit 1 according to FIGS. 1 to 6 with the parking rails 4 are shown schematically, the same consideration made in connection with FIG. 12 et seq. also hold true for the transfer unit 1 according to FIG. 7 and other, differently constructed transfer units 1. Transfer conveyors 21 may be another option, instead of the parking rails 4 in FIG. 12 et seq.

The variations shown in schematics in FIGS. 12 to 20 can be combined with each other.

According to one of the possible configurations of the transfer unit 1 according to the third variant, as shown in FIG. 7, the transfer unit 1 can be expanded in the x-direction as far as indicated by the dashed-line bracket. The chain conveyors 26 shown in FIG. 7 are not present in this configuration, instead, the transfer conveyor 21 is significantly longer in this configuration. But FIG. 7 does not show that.

Preferably, the first area element 11 is connected to the running rails 9 via the coupling gear 8, while the second area element 12 can rotate but is directly connected to the running rail 9 via the mounting element 23. Other variants are conceivable.

A preferred option is for both area elements 11, 12 to be flag-like. Other variants are conceivable. Preferably, the flag-like variant of the second area element 12 hangs downwards by the force of gravity, which will help it move easily through the second entrance 3, the entry area of the industrial truck 20, as long as the running rail 9 is folded up. Alternatives are conceivable.

In the variant of the transfer unit 1, that is shown in FIGS. 1 to 6, the shuttle 19 enters the transfer unit 1 on the running rails 9 and thus at a different height level, namely above the industrial truck 20. For example, in FIGS. 1 and 2, it is apparent that the motor 7.1 and the coupling gear 8 are arranged below the height level of the running rail 9. The shuttle 19 can therefore easily overcome the motor 7.1 while driving when entering in the transfer unit 1. At the same time, the motor 7.1 does not obstruct the path of the industrial truck 20 entering through the second entrance 3, because it is set up near the first entrance 2 and thus far from the second entrance 3.

FIGS. 3 and 8 to 11 show that pallet 15 can enter transversely into the transfer unit 1. A long edge of the rectangular pallet 15 thus runs along the z-axis in the longitudinal direction—i.e., x-direction—during the pallet's entry. It is also conceivable, of course, that a long edge of the pallet 15 runs in the longitudinal direction in the x-direction during entry, and that pallet 15 thus enters lengthwise into the transfer unit.

Distance and an extension of the centering stops 6 may differ from FIGS. 1 to 6. However, usually the extension and distance are chosen as follows: The industrial truck 20 can enter and exit through the second entrance 3 into and out of the transfer unit, whereby the raised pallet 15 does not get hung up on the centering stops 6 and the movement of the lifting devices used for lifting 22 is not disturbed by the expansion of the centering stops 6.

What is claimed:

1. A transfer unit for the transfer of a load carrier from a first vehicle to a second vehicle and vice versa, or from a first vehicle to a conveyor and vice versa, the transfer unit comprising:

a first entrance that permits entry of said first vehicle, at least one parking and receiving area for said load carrier, at which said first vehicle can park and receive said load carrier; and at least one centering device that is configured to center said load carrier;

wherein the transfer unit, relative to the first entrance, includes either a second entrance that allows the entry of said second vehicle, or is connected to said conveyor; wherein the least one centering device is arranged so that centering takes place in the transfer unit when said load carrier is transferred from said second vehicle to said first vehicle or from said conveyor to said first vehicle; wherein the transfer of said load carrier is from said second vehicle comprising an industrial truck to said first vehicle comprising a shuttle and vice versa, and the first entrance allows the entry of the shuttle; wherein the transfer unit includes a second entrance that allows the entry of said industrial truck; wherein the shuttle and said industrial truck can park and receive said load carrier on the parking and receiving area; and wherein the at least one centering device is arranged in the transfer unit so that centering can take place when said load carrier is transferred from said industrial truck to the shuttle; wherein the transfer unit includes a running rail that can be reversibly moved from a first to a second position; and wherein the running rail in the first position allows said industrial truck to enter the transfer unit, and the running rail in the second position allows the shuttle to enter the transfer unit.

2. The transfer unit according to claim 1, wherein the at least one centering device is able to run along a direction in which at least one of said first or second vehicles enters or exits the transfer unit, or along which said conveyor transports said load carrier into or out of the transfer unit.

3. The transfer unit according to claim 1, wherein the centering device runs orthogonal to a direction in which at least one of said vehicles enters or exits the transfer unit, or along which said conveyor transports said load carrier into or out of the transfer unit.

4. The transfer unit according to claim 1, including a first area element mechanically coupled to the running rail, the first area element is set up to be detected as an obstacle in the first position by a shuttle sensor; and/or by a second area element mechanically coupled to the running rail, which is set up to be detected as an obstacle in the second position by a sensor of said industrial truck.

5. The transfer unit according to claim 1, including a sensor, which is set up to detect a presence of a shuttle and/or a presence of an industrial truck in the transfer unit.

6. The transfer unit according to claim 1, wherein the at least one parking and receiving area includes a first parking and receiving area for said load carrier, at which a shuttle can park and receive said load carrier, and a second parking and receiving area for said load carrier, where an industrial truck can park and receive said load carrier; and the transfer unit includes a conveyor configured to move said load carrier between the first parking and receiving area and the second parking and receiving area.

7. The transfer unit according to claim 6, wherein the conveyor comprises a chain conveyor, a telescopic fork, or a roller race.

8. A rack equipped with a transfer unit according to claim 1, wherein the transfer unit is configured as a point of intersection between the rack and an area upstream of the rack.

9. The rack according to claim 8, wherein the area upstream of the rack comprises a pre-storage zone.

10. A shuttle system including a transfer unit according to claim 1, a rack, and a first vehicle, wherein the transfer unit is configured as a point of intersection between the rack and an area upstream of the rack.

11. A shuttle system including a transfer unit according to claim 1, wherein said first vehicle or said second vehicle comprises at least one industrial truck; and a light barrier; wherein the light barrier is configured to detect an industrial truck approaching the transfer unit and a person approaching the transfer unit, and the light barrier is also able to distinguish between the two via a muting function.

12. A method for transferring a load carrier with a transfer unit according to claim 1, the method comprising:

a conveyor or a first vehicle placing a load carrier on a parking and receiving area of the transfer unit;

centering the load carrier; and the conveyor or first vehicle picking up the load carrier from the parking and receiving area of the transfer unit.

13. The method according to claim 12 for transferring a load carrier in a transfer unit with a first entrance and a second entrance, the method comprising:

a shuttle or industrial truck comprising said first vehicle or said second vehicle, and carrying a load carrier entering the transfer unit through the first or second entrance;

the shuttle or industrial truck lowering the load carrier that is centered by sliding along the at least one centering device;

the shuttle or industrial truck leaving the transfer unit through one of the first entrance or the second entrance; and the industrial truck or shuttle entering the transfer unit through the other of the first entrance and the second entrance, and the industrial truck or shuttle picking up the load carrier previously left there, wherein the first entrance is opposite the second entrance.

14. The method according to claim 13 for transferring a load carrier in a transfer unit with a transfer conveyor, the method comprising:

placing a load carrier on the transfer conveyor of the transfer unit by a shuttle or a conveyor;

centering the load carrier;

the conveyor or shuttle picking up the load carrier from the transfer conveyor of the transfer unit.

15. A method for operating a shuttle system according to claim 13, wherein the shuttle and the industrial truck communicate directly or indirectly via a control device with the transfer unit to move a running rail from a first position to a second position or from the second position to the first position.

16. The method according to claim 15, wherein the running rail in the first position allows the industrial truck to enter the transfer unit, and the running rail in the second position allows the shuttle to enter the transfer unit.

17. A method for transferring a load carrier with a transfer unit, the method comprising:

providing a transfer unit for the transfer of a load carrier from a first vehicle to a second vehicle and vice versa, or from a first vehicle to a conveyor and vice versa, the transfer unit comprising a first entrance that permits entry of said first vehicle, at least one parking and receiving area for said load carrier, at which said first vehicle can park and receive said load carrier; and at least one centering device that is configured to center said load carrier; wherein the transfer unit, relative to the first entrance, includes either a second entrance that allows the entry of said second vehicle, or is connected to said conveyor; wherein the least one centering device is arranged so that centering takes place in the transfer unit when said load carrier is transferred from said second vehicle to said first vehicle or from said conveyor to said first vehicle;

a conveyor or a first vehicle placing a load carrier on a parking and receiving area of the transfer unit;

centering the load carrier;

the conveyor or first vehicle picking up the load carrier from the parking and receiving area of the transfer unit;

a shuttle or industrial truck comprising said first vehicle or said second vehicle, and carrying a load carrier entering the transfer unit through the first or second entrance;

the shuttle or industrial truck lowering the load carrier that is centered by sliding along the at least one centering device;

the shuttle or industrial truck leaving the transfer unit through one of the first entrance or the second entrance;

the industrial truck or shuttle entering the transfer unit through the other of the first entrance and the second entrance, and the industrial truck or shuttle picking up the load carrier previously left there; and wherein the first entrance opposite the second entrance; and the shuttle and the industrial truck communicate directly or indirectly via a control device with the transfer unit to move a running rail from a first position to a second position or from the second position to the first position.

18. The method according to claim 17 for transferring a load carrier in a transfer unit with a transfer conveyor, the method comprising:

placing a load carrier on the transfer conveyor of the transfer unit by a shuttle or a conveyor;

centering the load carrier;

the conveyor or shuttle picking up the load carrier from the transfer conveyor of the transfer unit.

* * * * *